United States Patent [19]

Ohtaki et al.

[11] Patent Number: 4,608,955
[45] Date of Patent: Sep. 2, 1986

[54] IGNITION TIMING CONTROL SYSTEM FOR AN AUTOMOTIVE ENGINE

[75] Inventors: Kiyoshi Ohtaki, Fuchu; Kazuo Hara, Musashino, both of Japan

[73] Assignee: Fuji Jukogyo Kabushiki Kaisha, Tokyo, Japan

[21] Appl. No.: 768,890

[22] Filed: Aug. 23, 1985

[51] Int. Cl.$^4$ .......................... F02P 5/10; F02M 25/06
[52] U.S. Cl. ...................................... 123/408; 123/571
[58] Field of Search ............... 123/407, 408, 568, 569, 123/571

[56] References Cited

U.S. PATENT DOCUMENTS

| | | | |
|---|---|---|---|
| 4,083,335 | 4/1978 | Ohata | 123/408 |
| 4,098,245 | 7/1978 | Ohata | 123/408 |
| 4,306,533 | 12/1981 | Matsumoto et al. | 123/571 |
| 4,454,854 | 6/1984 | Gotoh et al. | 123/571 |
| 4,467,673 | 8/1984 | Hamada et al. | 123/571 X |

FOREIGN PATENT DOCUMENTS 0070250  6/1977  Japan ................................. 123/408
0195048 11/1983  Japan ................................. 123/408

Primary Examiner—Willis R. Wolfe, Jr.
Attorney, Agent, or Firm—Martin A. Farber

[57] ABSTRACT

An ignition timing control system with an exhaust gas recirculation (EGR) system has a primary vacuum-advance mechanism operated by vacuum in an intake passage of an engine to advance the ignition timing of the engine, and a secondary vacuum-advance mechanism operated by vacuum in the intake passage to advance the ignition timing in addition to the operation of the primary vacuum-advance mechanism. A first solenoid operated valve is provided to render the secondary vacuum-advance mechanism inoperative. A second solenoid operated valve is provided for cutting off the EGR system. An electronic control unit responds to engine operating conditions in a low engine speed range except idling operation for closing the first and second solenoid operated valve to cut off the EGR system and to cut off the secondary vacuum-advance mechanism, thereby stopping the advancing of the ignition timing.

2 Claims, 4 Drawing Figures

4,608,955

IGNITION TIMING CONTROL SYSTEM FOR AN AUTOMOTIVE ENGINE

BACKGROUND OF THE INVENTION

The present invention relates to an ignition timing control system for an automotive engine having an exhaust gas recirculation (EGR) system.

In an engine for a motor vehicle, an EGR system is employed to lower the combustion temperature for reducing nitrogen oxides (NOx). The engine having the EGR system is arranged such that the ignition timing is advanced to a maximum extent during EGR operation, in order to prevent the reduction of driveability of the vehicle and the increase of fuel consumption due to the EGR. However, when the requirement of emission control regulation becomes servere, the amount of EGR must be increased to meet the requirement. When the amount of EGR increases, the deteriorations of driveability and fuel consumption can not be avoided by advancing of ignition timing. Accordingly, it has been proposed to cut off the EGR system or to leak the vacuum for operating an exhaust gas recirculation valve to control the recirculated gas so as to render the EGR system inoperative under particular conditions in order to prevent the deteriorations of the characteristics, although the engine operation is in an EGR operative range. However, if ignition timing remains advanced in the inoperative state of the EGR system, the engine is operated at extremely advanced ignition timing, which will cause the occurrence of knocking of the engine to reduce the driveability and increase fuel consumption.

SUMMARY OF THE INVENTION

The object of the present invention is to provide an ignition control system which operates to stop the advancing of the ignition timing of an engine when the EGR system is rendered inoperative in an EGR operating range of the engine operation.

According to the present invention, there is provided an ignition timing control system for an automotive engine having an exhaust gas recirculation system which comprises an exhaust gas recirculation passage and an exhaust gas recirculation valve operated by a vacuum operated actuator and provided in the recirculation passage. The system comprises a primary vacuum-advance mechanism operated by vacuum at a first vacuum port of an intake passage of the engine to advance the ignition timing of the engine and a secondary vacuum-advance mechanism operated by vacuum at a second vacuum port of the intake passage to advance the ignition timing in addition to the operation of the primary vacuum-advance mechanism. A first solenoid operated valve is provided in a passage communicating the secondary vacuum-advance mechanism with the second vacuum port, a second solenoid operated valve is provided in a passage communicating a third vacuum port of the intake passage with a vacuum chamber of the vacuum operated actuator, and an electronic control unit is provided to respond to engine operating conditions in a low engine speed range except idling operation for closing the first and second solenoid operated valve to cut off the exhaust gas recirculation system and to cut off the passage for the first solenoid operated valve, thereby stopping the advancing of the ignition timing.

In an aspect of the present invention, the first vacuum port is located just above a closed throttle position and the second vacuum port is located at a position slightly above the first vacuum port in the intake passage.

The other objects and features of this invention will be apparently understood from the following description with reference to the accompanying drawings.

DETAILED DESCRIPTION OF THE PREFERRED EMBODIMENT

Figure 1:
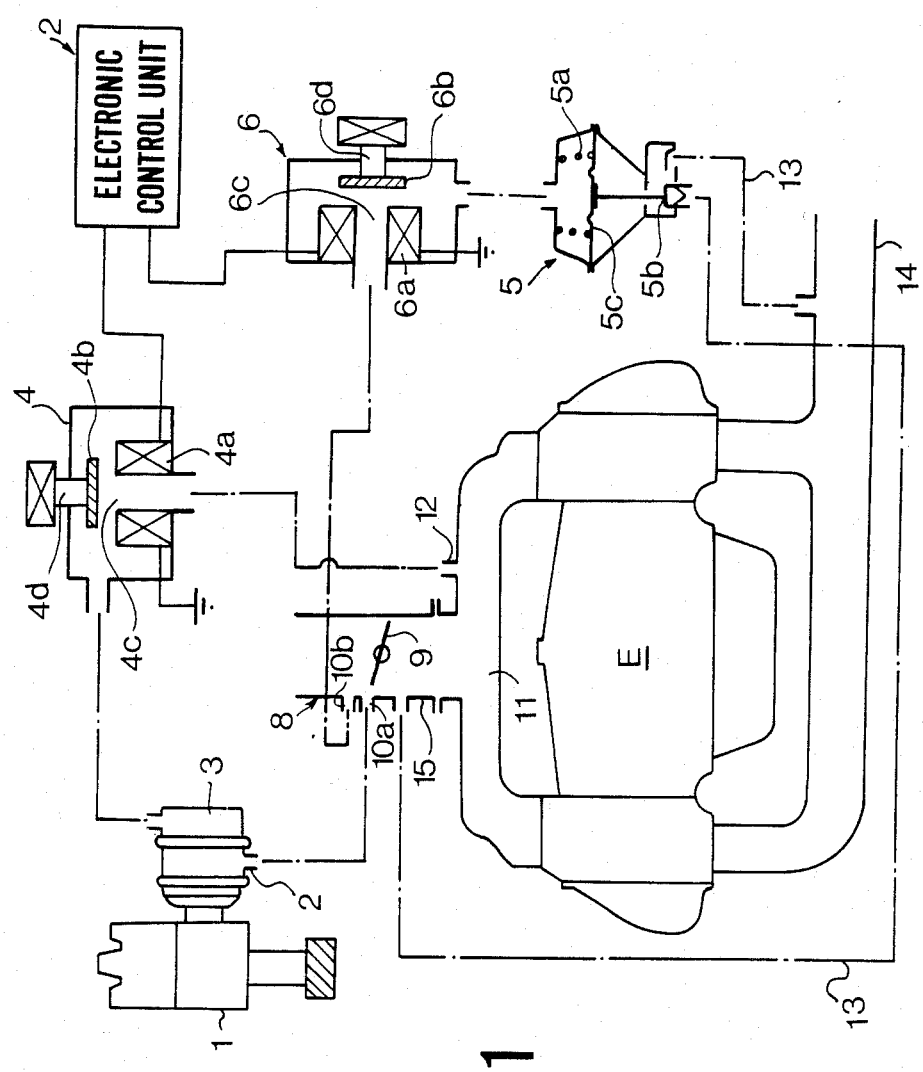
FIG. 1 is a schematic illustration showing a system according to the present invention.

Referring to FIG. 1, an automotive engine E has a distributor 1. The distributor 1 is provided with a primary vacuum-advance mechanism 2 and a secondary vacuum-advance mechanism 3. The primary vacuum-advance mechanism is a conventional type. Namely, the vacuum operated actuator (not shown) of the primary vacuum-advance mechanism 2 is communicated with a first vacuum port 10a provided in a carburetor 8 at a portion just above a throttle valve 9 when it is closed. The vacuum operated actuator of the secondary vacuum-advance mechanism 3 is communicated through a first solenoid three-way valve 4 with a manifold vacuum port 12 formed in an intake manifold 11. The first solenoid three-way valve 4 comprises a solenoid 4a, valve body 4b, valve port 4c, and vent port 4d. An EGR valve 5 comprises a vacuum chamber 5a, defined by a diaphragm 5c and a valve body 5b provided in an exhaust recirculation passage 13 communicating an exhaust pipe 14 with an intake passage 15. The valve body 5b is operatively connected to the diaphragm 5c to be operated by the deflection of the diaphragm. The vacuum chamber 5b is communicated with a second vacuum port 10b through a second solenoid three-way valve 6. The second solenoid three-way valve 6 comprises a solenoid 6a, valve body 6b, valve port 6c, and vent port 6d. The second port 10b is positioned at a location slightly above the first vacuum port 10a. Solenoids 4a and 6a of three-way valves 4 and 6 are applied with an EGR cut off signal from an electronic control unit 7. Both valves have valve bodies 4b and 6b, respectively. Each valve body operates by excitation of the solenoid 4a(6a) to close the valve port 4c(6c) to open the vent port 4d(6d).

Figure 2:
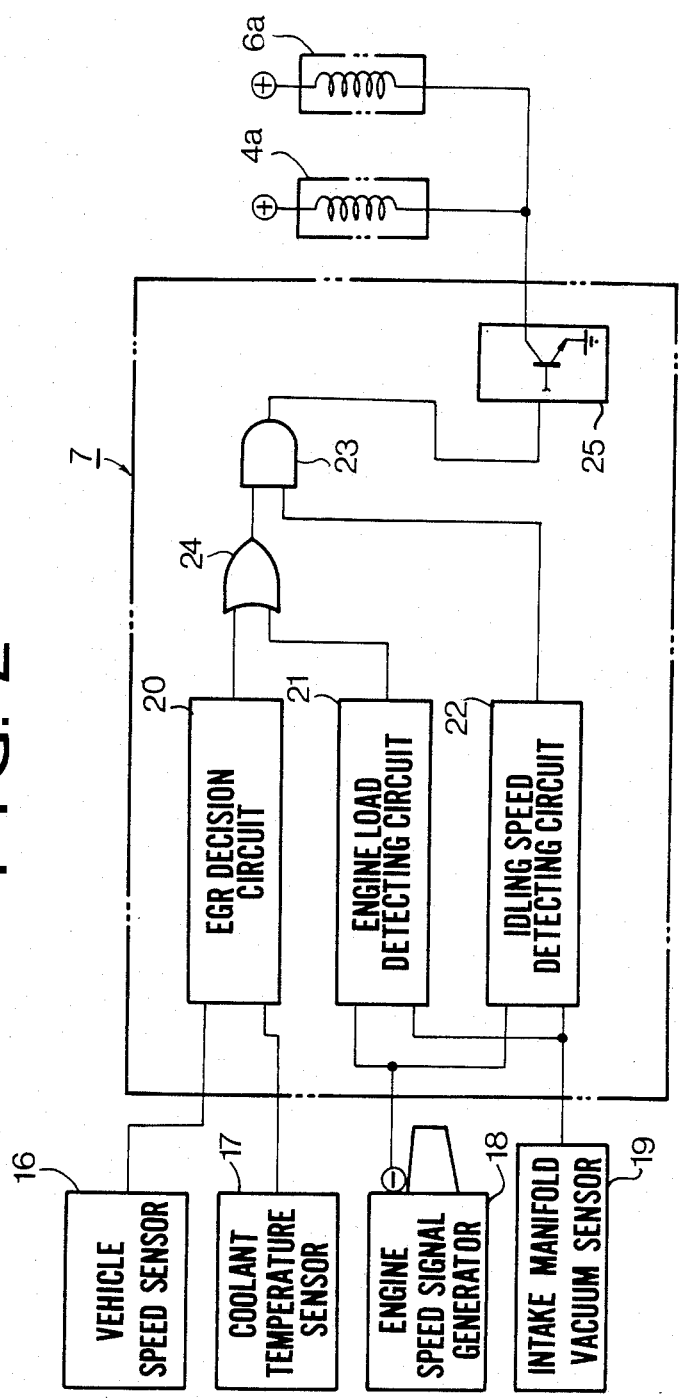
FIG. 2 is a block diagram showing a control circuit according to the present invention.

FIG. 2 shows an example of the electronic control unit 7. There is provided a vehicle speed sensor 16, coolant temperature sensor 17, engine speed signal generator 18 for producing an output signal dependent on the primary coil signal of an ignition coil, and intake manifold vacuum sensor 19. Output signals of the sensors 16 and 17 are applied to an EGR decision circuit 20. The EGR decision circuit 20 is provided to produce an EGR signal having a high level when vehicle speed exceeds a predetermined value (for example 45 km/H) and coolant temperature is lower than a predetermined value (70° C.). Output signals of generator 18 and sensor 19 are applied to an engine load detecting circuit 21 for detecting the partial load of the engine and to an idling speed detecting circuit 22. The partial load range detecting circuit 21 produces an output signal having a high level when engine speed is lower than a predetermined value (1200 rpm) and intake manifold vacuum is lower than a predetermined value (−350 mmHg). The idling speed detecting circuit 22 is adapted to produce an output signal having a low level when engine speed is lower than 1400 rpm and intake manifold vacuum is higher than −350 mmHg. Outputs signals of circuits 20 and 21 are applied to an AND gate 23 through an OR gate 24, and the output signal of the circuit 22 is directly applied to the AND gate 23. The output signal of the AND gate is applied to a driver 25 so as to excite solenoids 4a and 6a.

In idling operation, since the output of the idle speed detecting circuit 22 is at a low level, AND gate 23 is closed. Accordingly, solenoids 4a and 6a do not excite, so that the secondary vacuum-advance mechanism 3 is communicated with the intake manifold 11 and vacuum chamber 5a of EGR valve 5 is communicated with the second vacuum port 10b. Since the throttle valve 9 is at the idling position, the pressure at the port 10b is at the atmospheric pressure. Accordingly, the valve body 5b closes the passage 13. On the other hand, the secondary vacuum-advance mechanism 3 is operated by the intake manifold vacuum to advance the ignition timing. Thus, advancing control at the idling range can be performed, thereby improving fuel consumption. A range C in FIG. 4 shows the advancing control range at idling.

When the EGR decision circuit 20 produces an output signal at a high vehicle speed, and the output of the circuit 22 is at a high level, the driver 25 operates to energize solenoids 4a and 6a, so that ports 4c and 6c are closed. Thus, the EGR system does not operate and the ignition timing is advanced by the primary vacuum-advance mechanism 2. When engine speed is lower than 1200 rpm and intake manifold vacuum is lower than −350 mmHg, the output of the partial load range detecting circuit 21 is at a high level. Accordingly, solenoids 4a and 6a are energized to close ports 4c and 6c. Thus, EGR is cut off and the ignition timing is set by the primary advance mechanism 2. Ranges A and B in FIG. 4 show such a control range.

Figure 4:
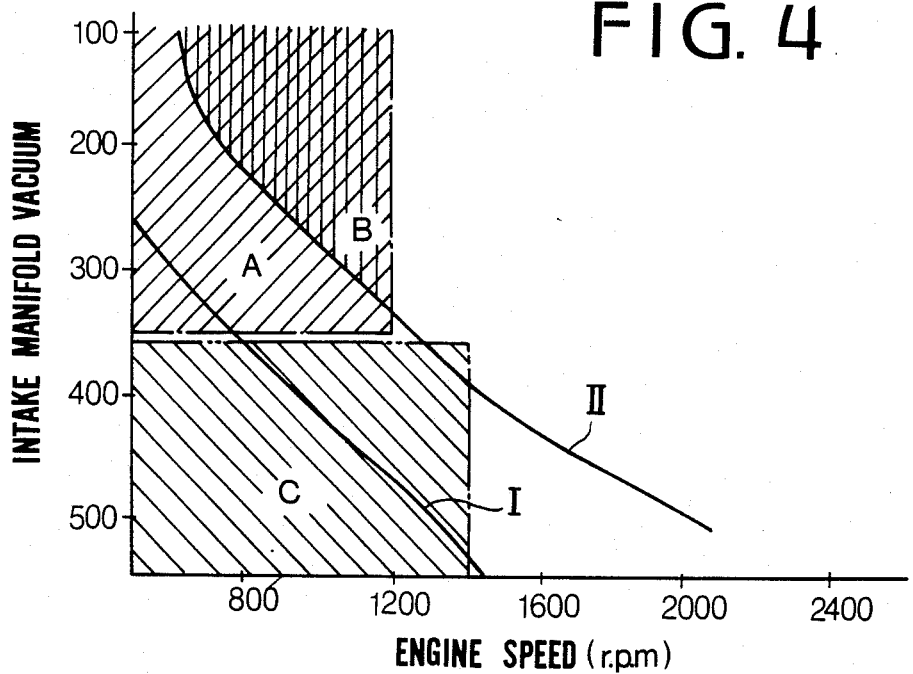
FIG. 4 is a graph showing operating ranges of the system.

In FIG. 4, in the range above a line I, the vacuum at the port 10a is at level sufficient to operate the advance mechanism 2 to advance the ignition timing, and in the range above a line II, the vacuum at the port 10b opens the EGR valve 5.

In the range B, in a conventional system, the EGR system is cut off, but the ignition timing remains greatly advanced, which causes the occurrence of knocking. However, in the system of the present invention, the EGR system is cut off and the ignition timing is retarded by cutting off the circuit of the secondary vacuum-advance mechanism 3. Thus, the driveability of the vehicle can be improved. Further, in the range A, the EGR system does not operate. In the conventional system, ignition timing is advanced in such a range, which may cause the occurrence of knocking. Accordingly to the present invention, the ignition timing is retarded by cutting off the system of the advance mechanism 3, thereby preventing the knocking.

Figure 3:
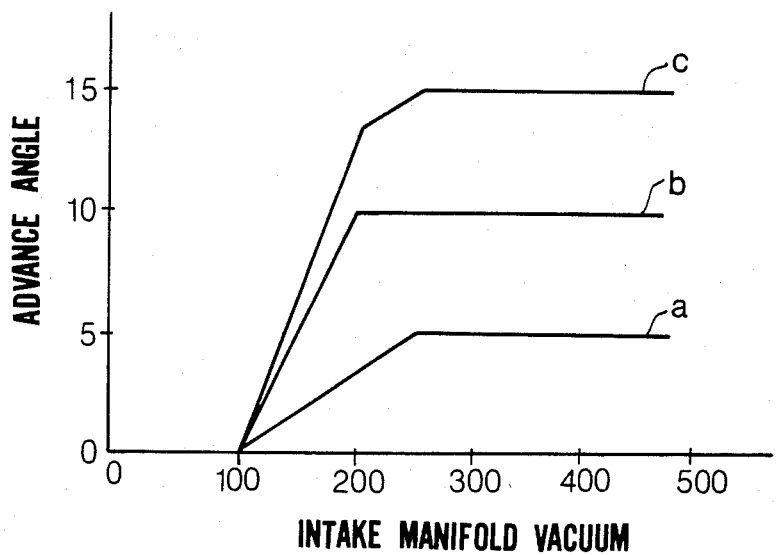
FIG. 3 is a graph showing the relationship between intake manifold pressure and advance angle.

In FIG. 3, a line a shows an advance characteristic by the secondary advance mechanism 3, line b shows an advance characteristic by the primary advance mechanism 2, and line c is a combined advance characteristic of lines a and b. The difference between lines c and b is the retard angle in the ranges A and B of FIG. 4 in accordance with the present invention.

While the presently referred embodiment of the present invention has been shown and described, it is to be understood that this disclosure is for the purpose of illustration and that various changes and modifications may be made without departing from the scope of the invention as set forth in the appended claims.

What is claimed is:

1. In an ignition timing control system for an automotive engine with an exhaust gas recirculation system having an exhaust gas recirculation passage and an exhaust gas recirculation valve operated by a vacuum operated actuator provided in the recirculation passage, the improvement comprising:

a primary vacuum-advance means responsive to the vacuum at a first vacuum port located at a position just above a closed throttle position of an intake passage of the engine for advancing the ignition timing of the engine;

secondary vacuum-advance means responsive to the vacuum at a manifold vacuum port of the intake passage for advancing the ignition timing in addition to the operation of the primary vacuum-advance mechanism;

a first solenoid valve provided in a passage communicating secondary vacuum-advance mechanism with the manifold vacuum port;

a second solenoid valve provided in a passage communicating a second vacuum port of the intake passage with a vacuum chamber of the vacuum operated actuator for the exhaust gas recirculation valve;

an electronic control unit responsive to engine operating conditions in a low engine speed range except idling operation for closing the first and second solenoid valves to cut off the exhaust gas recirculation system and to cut off the passage for the first solenoid valve, thereby stopping the advancing of the ignition timing.

2. The system according to claim 1 wherein the second vacuum port is located slightly above the first vacuum port, and the manifold vacuum port is located at a position downstream of a throttle valve of the engine.

* * * * *